J. R. HARRINGTON.
Carpet-Lining Machines.
No. 141,270. Patented July 29, 1873.
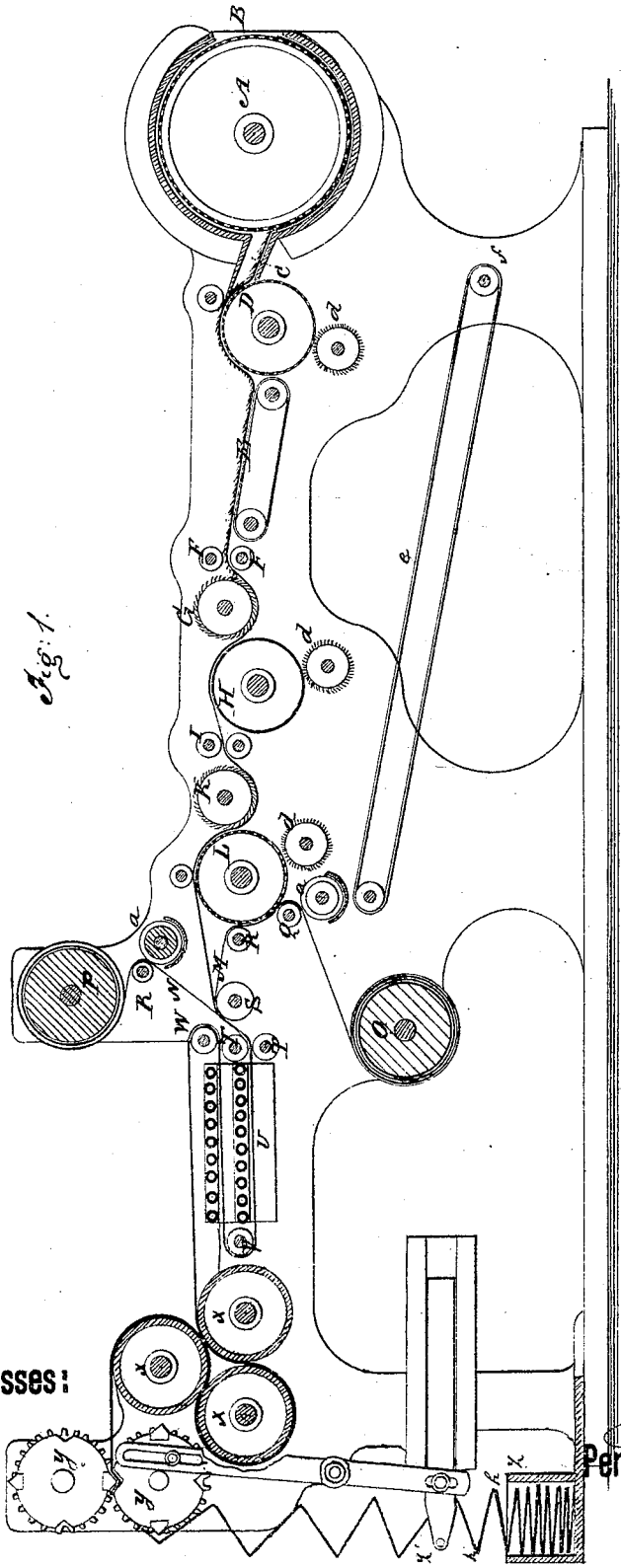
Witnesses:
Inventor:
John R. Harrington
Per
Attorneys.

UNITED STATES PATENT OFFICE.

JOHN R. HARRINGTON, OF BROOKLYN, N. Y.

IMPROVEMENT IN CARPET-LINING MACHINES.

Specification forming part of Letters Patent No. 141,270, dated July 29, 1873; application filed May 5, 1873.

*To all whom it may concern:*

Be it known that I, JOHN R. HARRINGTON, of Brooklyn, in the county of Kings and State of New York, have invented a new and useful Improvement in Manufacture of Carpet-Linings and Stair-Pads, of which the following is a specification:

My invention relates to a combination of revolving screens, carding-cylinders or scratchers, and feeding and condensing rollers, the object of which is to receive the cotton, flock, or other fibrous material from a willow or breaker, form it into a smooth lap of uniform thickness, and deliver it between sheets of cloth or paper, which form the upper and lower surfaces of the complete fabric and confine and secure the lap.

The drawing is a longitudinal sectional elevation of my improved machine.

A represents the willow or breaker, to which the cotton, flock, or other substance of which the lap is to be made is fed at B by an endless apron or any other suitable feeder, and which, after picking, breaking, and opening the stock, delivers it through the leader C to the revolving wire screen D, which separates some of the small stones, gravel, &c., and delivers it onto the endless wire carrier E, which also separates some of the refuse matters and delivers the stock to the feeding-rollers F, from which it is taken by a revolving carding or scratching cylinder, G, with coarse teeth, for opening and carding the stock, and then delivering it to another wire screen, H, after which it passes through feed-rollers I to a finer scratcher, K; then to another wire-screen, L, from which it is delivered in a smooth, even, and continuous lap between the inclosing-sheets M and N, which come from the rolls O P, respectively, over the guide-rollers Q and R, and unite with the lap on the roller S, from which they all move along together between the pressing-rollers T, through the heater U, over roller V, back through the heater again to roller W, and forward again through the heater to and between the heated calender-roller X, and lastly between the crimper-rollers Y, from which the crimped fabric descends into the receptacle Z under the guidance of the reciprocating adjuster Z'. a represents pasting-brushes, over which the inclosing-sheets pass to receive paste from the troughs of said brushes to unite said sheets and the lap. These brushes may be continuous, and paste the sheets the whole width; but I prefer to use a series of narrow brushes and apply the paste in stripes—say one stripe at each edge and one in the middle, which I find amply sufficient for causing the necessary adhesion. d represents rotary brushes under the rotary screens for keeping them from clogging and brushing off any adhering matters which fall onto the endless carrier e, and are carried to any suitable receptacle at f.

Having thus described my invention, I claim as new and desire to secure by Letters Patent—

The combination of willow A, leader C, screens D H L, endless screen E, scratchers G K, and feed-rollers, all arranged and operating substantially as specified.

JOHN R. $\times$ HARRINGTON.
his mark.

Witnesses:
   T. B. MOSHER,
   ALEX. F. ROBERTS.